United States Patent
Sakuma et al.

(10) Patent No.: US 6,351,312 B1
(45) Date of Patent: Feb. 26, 2002

(54) INTERFERENCE-TYPE DISTANCE MEASURING DEVICE

(75) Inventors: Hirokazu Sakuma; Takashi Okamuro; Yoshimitsu Sato; Toshiro Nakashima; Hajime Nakajima, all of Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/463,221

(22) PCT Filed: Jul. 23, 1997

(86) PCT No.: PCT/JP97/02549

§ 371 Date: Feb. 8, 2000

§ 102(e) Date: Feb. 8, 2000

(87) PCT Pub. No.: WO99/05471

PCT Pub. Date: Feb. 4, 1999

(51) Int. Cl.[7] ................................................ G01B 9/02
(52) U.S. Cl. ...................................... 356/498; 356/486
(58) Field of Search ............................... 356/484, 485, 356/486, 487, 489, 490, 492, 493, 495, 498, 500

(56) References Cited

U.S. PATENT DOCUMENTS 3,825,737 A   7/1974 Croisier
5,235,406 A * 8/1993 Ishii et al. .................. 356/498
5,347,355 A * 9/1994 Eguchi ....................... 356/498

FOREIGN PATENT DOCUMENTS

| EP | A-0 401 799 | 12/1990 |
| JP | 1-206283 | 8/1989 |
| JP | 40-3272404 | * 12/1991 |
| JP | 6-66516 | 3/1994 |
| JP | 8-5314 | 1/1996 |
| JP | 10-170217 | 6/1998 |

OTHER PUBLICATIONS

Hoya–Schott, Optical Devices, Apr. 1, 1995.

* cited by examiner

*Primary Examiner*—Samuel A. Turner
(74) *Attorney, Agent, or Firm*—Sughrue Mion, PLLC

(57) ABSTRACT

An interference-type distance measuring device generates a reference beam having a first frequency and detection beam having a second frequency and directs these beams toward a moving detection unit which reflects these beams toward an interference system, where these beams are used to generate a detection interference wave. A reference interference wave generated by the interference system is converted into a first sine-wave signal, the interference detection wave is converted into a second sine-wave signal, first and second cosine-wave signals are generated from the first and second sine-wave signals, and the position of the motion detection unit is detected based upon these four signals.

9 Claims, 8 Drawing Sheets

INTERFERENCE-TYPE DISTANCE MEASURING DEVICE

TECHNICAL FIELD

This invention relates to a length measuring device for generating a detection interference wave according to the distance between a light emitting portion, which is operative to emit laser light, and a moving detection portion, for A/D-converting the aforesaid detection interference wave and a reference interference wave to thereby obtain the phase difference between both of the interference waves, and for determining the position of the aforementioned moving detection portion from this phase difference and the detected wavelength of the aforesaid laser light.

BACKGROUND ART

A conventional length measuring device will be described hereinbelow with reference to FIG. 4, FIG. 5, FIG. 6. FIG. 7 and FIG. 8. FIG. 4 is a block diagram schematically showing the configuration of a conventional length measuring device. Further, FIG. 5 is a diagram showing a concrete length measuring mechanism of the conventional length measuring device. Moreover, FIG. 6 is a diagram showing a part of a signal processing portion (namely, a phase difference processing portion), an operation portion and a storage portion of the conventional length measuring device. Moreover, FIG. 7 is a diagram illustrating the relation between the wavelength of laser light thereof and the ratio of the intensity of transmitted light to that of reflected light thereof. Moreover, FIG. 8 is a diagram showing the configurations of another part of the signal processing portion, the operation portion and the storage portion of the conventional length device.

In FIG. 4, reference numeral 100 designates a light emitting portion for emitting laser light having a frequency f; 200 an interference system; 300 a moving detection portion; 400 a light receive portion; 500 a signal processing portion; 600 an operation portion; and 700 a storage portion.

In FIG. 5, reference numeral 100 denotes a laser diode (LD) composing the light emitting portion; and 201 an acousto-optic modulator (AOM) adapted to generate light, whose frequency is (f+f1), when receiving laser light, whose frequency is f, from the laser diode 100. Similarly, reference numeral 202 represents an acousto-optic modulator (AOM) which is driven at a frequency f2 and generates light, whose frequency is (f+f2), when receiving laser light, whose frequency is f, from the laser diode 100. The frequency difference between the frequency f1 and the frequency f2 is set at a very small value.

Light 801 outputted from the acousto-optic modulator 201 is reflected by a mirror 301 of the moving detection portion 200 and is then incident on the light receiving portion 400 through the interference system 200. Further, light outputted from the acousto-optic modulator 202 is deflected by a prism 203 by a very small angle and thus becomes light 802 which is then reflected by the mirror 301 of the moving detection portion 300 and is further incident on the light receiving portion 400 through the interference system 200. Incidentally, reference numeral 204 designates a beam splitter of the wavelength-dependent type; 805 reflected light; and 806 transmitted light.

Further, in FIG. 5, reference numeral 401 denotes an optical element (namely, PD: photo diode), which is provided in the light receiving portion 400 as shown in this figure. This optical element 401 is operative to detect an interference wave 803 formed from the interference between light coming from the acousto-optic modulator 201 and light coming from the acousto-optic modulator 202. Similarly, reference numeral 402 designates an optical element (namely, PD: photo diode). This photo diode 402 is operative to detect an interference wave 804 produced from the interference between the light 801 and the light 802 which are incident on the light receiving portion 400.

The interference wave 803 inputted to the light receiving element 401 is employed as a reference interference wave. The position of the moving detection portion 300 is determined on the basis of the phase difference between this reference interference wave and the detected interference wave 804 which is inputted to the light receiving element 402.

As illustrated in FIG. 6, an output of the light receiving element 401 is inputted to a current-to-voltage conversion circuit 501 and is then converted into a voltage therein. Similarly, an output of the light receiving element 402 is inputted to a current-to-voltage conversion circuit 502 and is then converted into a voltage therein. A phase-difference count circuit 504 is operative to count clocks outputted from a phase-difference count clock generating circuit 503 in a time period between a zero-cross point of an output waveform of the current-to-voltage conversion circuit 501 and a zero-cross point of an output waveform of the current-to-voltage conversion circuit 502. A result of the counting performed by this phase-difference count circuit 504 is inputted to the microcomputer 600 composing the operation portion. This microcomputer 600 is operative to obtain a phase difference, which is represented by using an electrical angle, according to the result of the counting.

When the difference in optical path length between the two interference waves changes by a wavelength of the laser light, the phase difference therebetween varies by 360. Therefore, a quantity acquired by adding $2\pi n$ (incidentally, "n" is an integer) to the phase difference obtained in the aforementioned manner is a total phase difference. The position of the moving detection portion 300 is determined from this total phase difference. The integer "n" is determined by counting cycles, which correspond to the time duration of the interference wave outputted from the light receiving element 402 while the moving detection portion 300 from an origin to a current position thereof, by means of the phase-difference count circuit 504.

Generally, the wavelength of laser light is liable to vary. Moreover, the phase-difference between the interference waves is dependent on the wavelength of laser light outputted from the light emitting portion (namely, the laser diode) 100. Thus, the aforementioned distance cannot be known only by obtaining the total phase difference between the interference waves. It is, therefore, necessary to know the exact wavelength of the laser light. In the case of the conventional length measuring device, the wavelength of laser light is detected from transmitted light and reflected light, into which the laser light is split by the beam splitter 204 of the wavelength-dependent type, in the following manner.

As shown in FIG. 5, the light, which has a wavelength $\lambda$ and is incident on the beam splitter 204 of the wavelength-dependent type, is split into the transmitted light 806 and the reflected light 805. Furthermore, as illustrated in FIG. 7, there is established a predetermined relation between the wavelength $\lambda$ and (the ratio of the intensity of the transmitted light to the intensity of the reflected light). Therefore, the wavelength $\lambda$ of the incident light (namely, the laser light) can be found if the ratio of the intensity of the transmitted light to the intensity of the reflected light is known.

As illustrated in FIG. 8, the reflected light 805 coming from the beam splitter 204 of the wavelength-dependent type is incident on a light receiving element 403 and is then converted into a voltage by the current-to-voltage conversion circuit 505. This voltage is converted by an A/D converter 511 through a sample-and-hold circuit 507 and a multiplexer 508 into digital data which is subsequently supplied to the microcomputer 600.

Similarly, the transmitted light 806 of the wavelength-dependent type beam splitter 204 is incident on the light receiving element 404 and is then converted into a voltage by a current-to-voltage conversion circuit 506. This voltage is converted by the A/D converter 511 through the sample-and-hold circuit 507 and the multiplexer 508 into digital data which is subsequently supplied to the microcomputer 600.

The microcomputer 600 determines (the ratio of the intensity of the transmitted light to the intensity of the reflected light) on the basis of these digital data, and further obtains a wavelength $\lambda_1$ from the relation between (the ratio of the intensity of the transmitted light to the intensity of the reflected light) and the wavelength $\lambda$, which is illustrated in FIG. 7. Incidentally, the upper limit value and the lower limit value of the reference voltage value of the A/D converter 511 are generated by a reference voltage upper-limit-value generating circuit 509 and a reference voltage lower-limit-value generating circuit 510, respectively.

The aforementioned conventional length measuring device has a problem in that when the aforesaid distance is determined by detecting the phase difference between the interference wave signals, it is necessary for enhancing phase-difference detecting resolution to increase the clock frequency of the phase-difference count clock generating circuit 503 which is used for detecting the aforementioned phase difference illustrated in FIG. 6, and this is technically difficult to achieve. For example, there has been the need for further increasing the clock frequency which is usually 200 MHz or so. This has been very difficult to achieve.

Further, the conventional length measuring device has another problem in that although the resolution used at the time of A/D-converting the reflected light 805 and the transmitted light 806, which come from the beam splitter of the wavelength-dependent type 204, by means of the A/D converter 511 is enhanced by increasing the resolution used by the A/D converter 511, countermeasures against variation in data due to noises are required and a filter is needed.

Moreover, the conventional length measuring device has still another problem in that in the case where a reference (namely, a reference voltage) of the A/D converter 511 varies owing to a change in power supply, an error occurs in A/D-converted data. For instance, in the case of a 12-bit A/D converter having such a voltage of 5 V, the variation in voltage corresponding to data outputted thereof is 1.2 mV/bit. In contrast, in the case of an ordinary power supply, a variation in power supply voltage thereof is 10 mV or so. Moreover, a power supply, which assures a supply voltage at a smaller variation, is expensive.

Furthermore, the conventional length measuring device has yet another problem in that precise temperature control, or accurate control over an injection current to the laser diode 100 is needed so as to prevent the wavelength of laser light coming from a light source from varying, and this results in increase in complexity and cost of the device.

Additionally, the conventional length measuring device has a further problem in that the use of an expensive high-resolution A/D converter is required so as to accurately detect a variation corresponding to a wavelength of laser light by using the beam splitter 204 of the wavelength-dependent type.

Besides, the conventional length measuring device has another problem in that an error due to drift of an electronic circuit is included in A/D-converted data obtained by A/D-converting the reflected light 805 and the transmitted light 806, which come from the beam splitter 204 of the wavelength-dependent type, and thus an error is caused in the detecting accuracy thereof.

Further, the conventional length measuring device has still another problem in that a variation in the correlation characteristics between the ratio of the intensity of the transmitted light 806 to the intensity of the reflected light 805 and the wavelength is caused in the beam splitter 204 of the wavelength-dependent type under the influence of a change in temperature, and consequently, an error occurs in the detected wavelength.

This invention is accomplished to resolve the aforementioned problems. Accordingly, an object of this invention is to obtain a length measuring device which is operative to generate a sinusoidal wave signal and a cosinusoidal wave signal from an interference wave signal by differentiation or integration, and then A/D-converting these sinusoidal and cosinusoidal wave signals, and subsequently, calculate an electrical angle by electrical interpolation, and moreover, calculate another electrical angle from another interference wave signal in a similar manner, and then calculate a phase difference between both of the electrical angles, and furthermore, correct an error caused by an electronic signal, and which thereby can detect an accurate position of the moving detection portion at all times.

Further, another object of this invention is to obtain a length measuring device which is operative to hold a sinusoidal wave signal, a cosinusoidal wave signal, the inverting signals obtained by inverting these signals, and a reference voltage (namely, a standard voltage) simultaneously, and which doubles the number of divisions for the A/D-converted data without enhancing the resolution used by the A/D converter, and which thus can achieve the high-resolution detection of the position of the moving detection portion in a stable manner even when a change in the power supply occurs.

Moreover, still another object of this invention is to obtain a length measuring device which can achieve the high-precision detection of the wavelength of laser light and the accurate detection of the position of the moving detection portion without using a high-resolution A/D converter by varying the reference voltage of an amplifier for amplifying the transmitted light and the reflected light coming from a beam splitter of the wavelength-dependent type in the case that the variation in laser wavelength is detected by the aforesaid beam splitter of the wavelength-dependent type.

Furthermore, yet another object of the present invention is to obtain a length measuring device which can achieve the accurate detection of the position of the moving detection portion by interrupting electric current outputted from the light receiving element and correcting a variation corresponding to a drift caused by the electronic circuit.

Additionally, a further object of this invention is to obtain a length measuring device which can achieve the accurate detection of the position of the moving detection portion without high-precision temperature control and without injection current control, by being provided with a fixed detecting portion, which is placed at a constant distance from the light emitting portion at all times, independent of the distance between the moving detection portion, which is adapted to move, and the light emitting portion.

DISCLOSURE OF THE INVENTION

A length measuring device of the present invention comprises: a light emitting portion for emitting laser light; an interference system for receiving the aforesaid laser light, for generating reference light having a first frequency, for outputting the reference light straight, for generating detection light having a second frequency, and for outputting the aforesaid detection light at a predetermined tilt angle; a moving detection portion for reflecting the aforesaid reference light and the aforesaid detection light toward the aforesaid interference system; a light receiving portion for converting a reference interference wave, which is generated by the aforesaid interference system, into a first sinusoidal wave electrical signal according to the aforesaid laser light and for converting a detection interference wave, which is generated from an optical-path-length difference between the aforesaid reflected reference light and the aforesaid reflected detection light, into a second sinusoidal wave electrical signal; a signal processing portion for generating a first cosinusoidal wave signal from the aforesaid first sinusoidal wave signal, for generating a second cosinusoidal wave signal from the aforesaid second sinusoidal wave signal, and for A/D-converting the aforesaid first sinusoidal wave signal and the aforesaid first cosinusoidal wave signal, and the aforesaid second sinusoidal wave signal and the aforesaid second cosinusoidal wave signal; and an operation portion for obtaining an electrical angle of the aforesaid reference interference wave according to a ratio between the A/D-converted first sinusoidal wave data and the A/D-converted first cosinusoidal wave data, for obtaining an electrical angle of the aforesaid detection interference wave according to a ratio between the A/D-converted second sinusoidal wave data and the A/D-converted second cosinusoidal wave data, for obtaining a phase difference between the aforesaid reference interference wave and the aforesaid detection interference wave from the aforesaid two electrical angles, and for detecting a position of the aforesaid moving detection portion according to this phase difference and a wavelength of the aforesaid laser light.

Further, a length measuring device of this invention is adapted so that the aforesaid signal processing portion includes a cosinusoidal wave generating circuit for generating a cosinusoidal wave signal, and that the aforesaid operation portion is operative to correct a phase error of the aforesaid cosinusoidal wave signal generating circuit according to an addition theorem applied to trigonometric functions.

Moreover, a length measuring device of this invention is adapted so that the aforesaid cosinusoidal wave generating circuit is a differentiating circuit, and that the aforesaid operation portion is operative to correct a phase lag of the aforesaid differentiating circuit according to an addition theorem applied to trigonometric functions.

Additionally, a length measuring device of this invention is be adapted so that the aforesaid cosinusoidal wave generating circuit is an integrating circuit, and that the aforesaid operation portion is operative to correct a phase advance of the aforesaid integrating circuit according to an addition theorem applied to trigonometric functions.

Besides, a length measuring device of this invention is adapted so that the aforesaid signal processing portion includes an inverting circuit, a sample-and-hold circuit and an A/D converter, and that the aforesaid inverting circuit is operative to perform an inversion on the aforesaid first sinusoidal wave signal and the aforesaid first cosinusoidal wave signal and the aforesaid second sinusoidal wave signal and the aforesaid second cosinusoidal wave signal, that the aforesaid sample-and-hold circuit holds the aforesaid inverting signals, which are obtained by the inversion, and original non-inverting signals simultaneously, and that the aforesaid A/D converter is operative to A/D-convert the aforesaid signals held simultaneously.

Further, a length measuring device of the present invention is adapted so that the aforesaid signal processing portion includes a reference voltage generating circuit for generating a reference voltage of the aforesaid A/D converter, and that the aforesaid sample-and-hold circuit is operative to simultaneously hold the reference voltage of the aforesaid A/D converter when simultaneously holding the aforesaid inverting signal and the aforesaid original non-inverting signal.

Moreover, a length measuring device of the present invention is adapted so that the aforesaid system includes a beam splitter of the wavelength-dependent type for receiving the aforesaid laser light and for outputting reflected light and transmitted light, which are respectively obtained by reflecting and transmitting the aforesaid laser light, that the aforesaid light receiving portion converts the aforesaid reflected light and the aforesaid transmitted light into electrical signals, and that the aforesaid signal processing portion includes an amplifying circuit for amplifying the aforesaid electrical signals, and a reference voltage generating circuit for generating a reference voltage of the aforesaid amplifying circuit, and that the aforesaid operation portion is operative to change the reference voltage of the aforesaid amplifying circuit by controlling the aforesaid reference voltage generating circuit according to variations in amounts of the aforesaid reflected light and the aforesaid transmitted light, which are caused owing to a change in wavelength of the aforesaid laser light.

Furthermore, a length measuring device of this invention is adapted so that the aforesaid signal processing portion includes a switch for turning on or off an electrical signal coming from the aforesaid light receiving portion, and that the aforesaid operation portion is operative to eliminate a variation, which corresponds to a drift, by subtracting data, which is obtained when the aforesaid switch is turned off, from data obtained when the aforesaid switch is turned on.

Additionally, a length measuring device of this invention further comprise a fixed detection portion, which has a structure similar to that of the aforesaid moving detection portion and is fixed at a known distance from the aforesaid interference system, and is adapted so that the aforesaid operation portion is operative to calculate a phase difference relating to the aforesaid fixed detection portion similarly as in a case of the aforesaid moving detection portion, and to correct the detected phase difference relating to the aforesaid moving detection portion.

BEST MODE FOR CARRYING OUT THE INVENTION

Hereinafter, each of embodiments of this invention will be described with reference to the accompanying drawings.

EMBODIMENT 1

Figure 1:
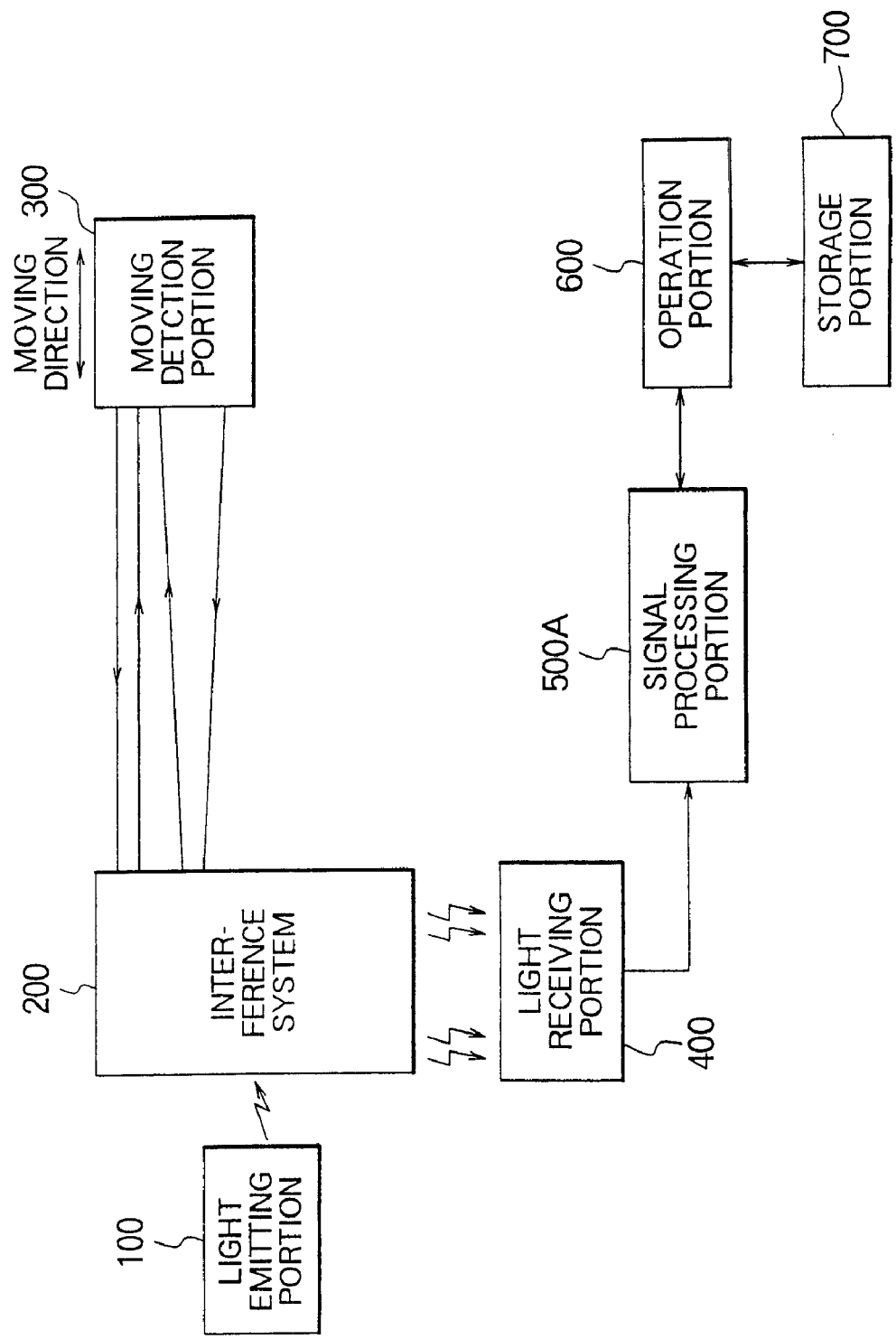
FIG. 1 is a block diagram schematically showing the configuration of a length measuring device which is "Embodiment 1" of this invention.
Figure 2:
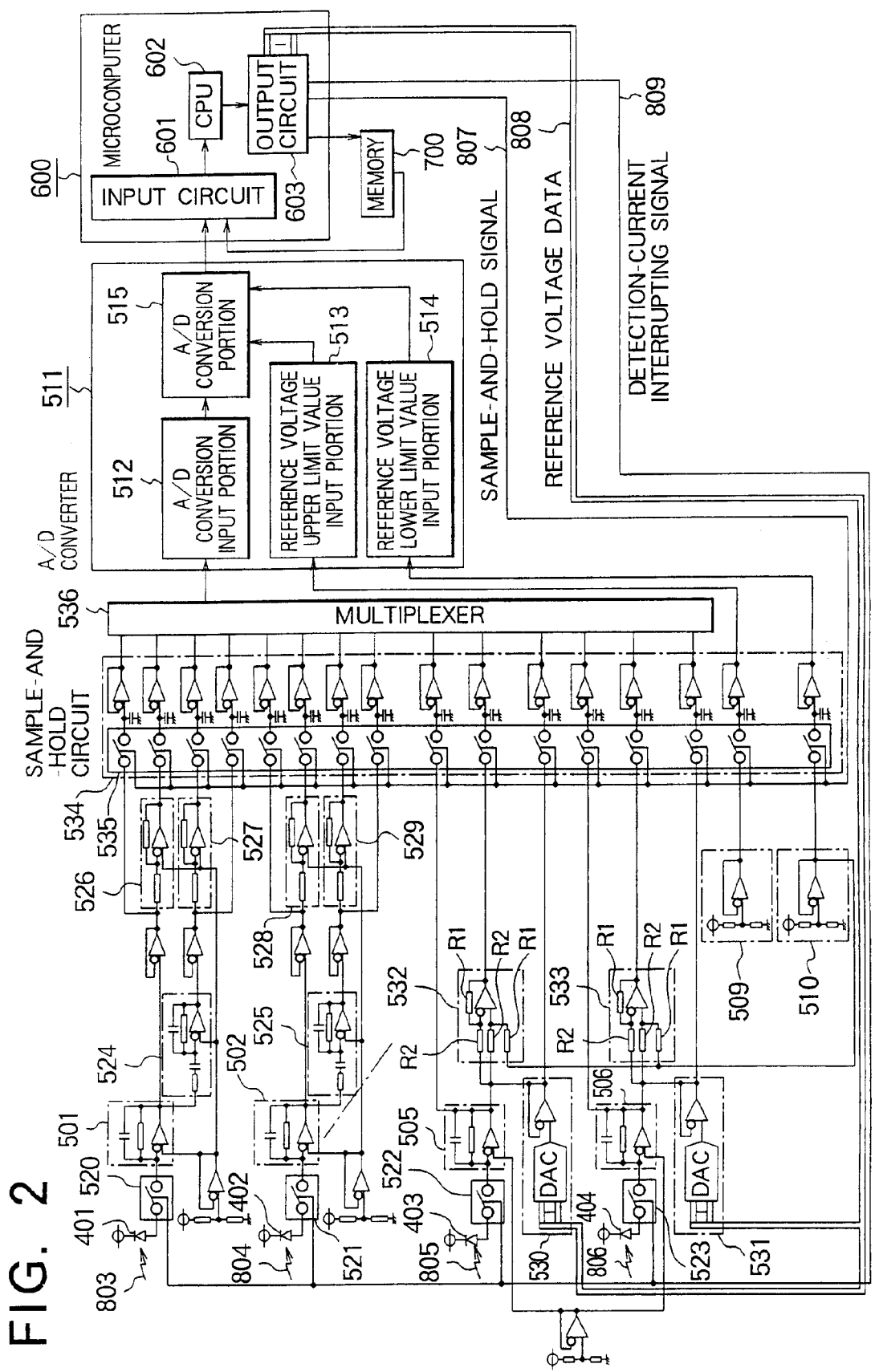
FIG. 2 is a diagram showing the configurations of the signal processing portion, the operation portion and the storage portion of the length measuring device which is "Embodiment 1" of this invention.

Length measuring device, which is "Embodiment 1" of this invention will be described hereinbelow by referring to FIG. 1 and FIG. 2. FIG. 1 is a block diagram schematically showing the configuration of a length measuring device which is "Embodiment 1" of this invention. FIG. 2 is a diagram showing the configurations of a signal processing portion, a operation portion and a storage portion of the length measuring device which is "Embodiment 1" of this invention. Incidentally, in each of these figures, same reference characters designate same or corresponding portions.

In FIG. 1, reference numeral 100 designates a light emitting portion for emitting laser light of a frequency f; 200 an interference system; 300 a moving detection portion; 400 the light receiving portion; 500A the signal processing portion; 600 the operation portion; and 700 the storage portion.

In FIG. 2, reference numerals 401, 402, 403 and 404 denote light receiving elements (namely, PDs) composing the light receiving portion 400; 520, 521, 522 and 523 switches; 501, 502, 505 and 506 current-to-voltage converting circuits for converting detection currents, which are outputted from the light receiving elements 401 to 404, into voltages, respectively; and 524 and 525 differentiating circuits. Incidentally, the signal processing portion 500A includes the elements from the switches 520 to 523 to the A/D converter 511.

Reference interference wave 803 having been incident on the light receiving element 401 is converted into a sinusoidal wave voltage signal from which a cosinusoidal wave signal is generated by the differentiating circuit 524. Thus, two signals, namely, the sinusoidal wave signal and the cosinusoidal wave signal are obtained from one interference wave signal. Incidentally, these sinusoidal and cosinusoidal wave signals are not ideal signals but are a pseudo-sinusoidal-wave signal and a pseudo-cosinusoidal-wave signal which have distortions caused by the elements and the electronic circuit.

These sinusoidal-wave and cosinusoidal-wave signals are A/D-converted by the A/D converter 511 into digital data which is supplied to the microcomputer 600 constituting the operation portion.

Microcomputer 600 obtains an electrical angle of the reference interference wave 803, which is inputted to the light receiving element 401, from the ratio between the data obtained by A/D-converting the sinusoidal wave signal and the cosinusoidal wave signal, respectively (namely, the ratio of A/D-converted sinusoidal wave data to A/D-converted cosinusoidal wave data). Namely, a table representing the relation between this ratio and the electrical angle is preliminarily prepared in a memory 700 serving as the storage portion. The electrical angle is determined by reading the contents of this table. This table is prepared by determining an address, which corresponds to a location in the memory, from the aforementioned ratio and by then storing the electrical angle, which corresponds to this ratio, at the address. Electrical angle of the detection interference wave 804 to be inputted to the light receiving element is determined in a similar way.

Thus, electrical interpolation (namely, an operation of calculating an electrical angle) is achieved from one interference wave signal. Further, although the differentiating circuits 524 and 525 are used in the case of the device of FIG. 2, a cosinusoidal wave signal can be obtained from the interference wave signal even in the case of using integrating circuits instead of the differentiating circuits.

Phase difference between the reference interference wave 803 and the detection interference wave 804 can be obtained from the electrical angles of these two interference waves, which are determined in the aforementioned manner. The position of the moving detection portion 300 (namely, the distance thereof from the interference system) can be obtained this phase difference and the wavelength of the laser light.

Meanwhile, the phase difference between the interference wave (namely, the sinusoidal wave) signal and each of the cosinusoidal wave signals respectively generated by the differentiating circuits 524 and 525 differs from an intrinsic phase difference between the sinusoidal and cosinusoidal wave signals (namely, an electrical angle of 90 degrees) owing to a phase lag (namely, a phase error) caused by the corresponding one of the differentiating circuits 524 and 525. Therefore, accurate electrical interpolation is performed by correcting this "phase displacement" by using the microcomputer 600. Correction of the "phase displacement" is performed in accordance with the following equation (1):

$$\text{(post-phase-correction A/D-converted cosinusoidal wave data)} = \text{(pre-phase-correction A/D-converted cosinusoidal wave data)} \times \text{("phase correction constant 1")} - \text{(A/D-converted sinusoidal wave data)} \times \text{("phase correction constant 2")} \quad \text{eq. (1)}$$

Incidentally, let "$\alpha$" denote the phase displacement between the sinusoidal or cosinusoidal signal, which is generated from the interference wave signal, and the ideal sinusoidal or cosinusoidal signal. Thus, the "phase correction constant 1" and the "phase correction constant 2" have values which will be described below. This "phase displacement $\alpha$" is preliminarily found, for example, at the time of assembling the device and stored in the storage portion 700.

the "phase correction constant 1"=1/COS $\alpha$ the "phase correction constant 2"=TAN $\alpha$ Incidentally, the aforementioned equation (1) can be derived according to the addition theorem applied to trigonometric functions as follows:

$$COS(\theta a+\theta b)=COS\ \theta a \cdot COS\ \theta b+SIN\ \theta a \cdot SIN\ \theta b$$

Namely, the aforementioned equation (1) is obtained by the following development which is based on the aforementioned addition theorem applied to the trigonometric functions.

$$COS\ \theta a = \{COS\ (\theta a + \theta b) \cdot (1/COS\ \theta b)\} - SIN\ \theta a \cdot TAN\ \theta b$$

Thus, the phase lag caused by each of the differentiating circuit 524 and 525 can be corrected according to the equation (1). Consequently, the accurate calculation of the position data, whose phase error caused by the circuit is corrected, can be achieved. Namely, the electrical angle of the interference wave signal is determined from the ratio between the A/D-converted sinusoidal wave data and the post-phase correction A/D-converted cosinusoidal wave data which is corrected according to the equation (1).

Furthermore, to increase the number of divisions for the electrical interpolation and enhance the resolution of the position data, the inverting signals obtained by inverting the sinusoidal and cosinusoidal wave signals are generated by the inverting circuits 526, 527, 528 and 529, which are illustrated in FIG. 2. These inverting signals and the sinusoidal and cosinusoidal wave signals, which are non-inverting signals, are simultaneously held by the sample-and-hold circuit 54 under the control of a sample-and-hold signal 807 outputted from the microcomputer 600. These signals are then converted by the A/D converter 511 into digital data. Thereby, the two-fold improvement in the accuracy in detecting an amount of change in the interference signal is attained. This is because of the fact that as compared with the difference in voltage level between such a signal and 0 (zero) level, the difference in voltage level between such a signal and the inverting signal thereof is twice the difference between the voltage level thereof and the zero level. In other words, the two-fold improvement in the resolution of the position data is achieved twice without enhancing the resolution used by the A/D converter 511.

Further, when the aforementioned interference wave signal is held, output voltages of the reference voltage upper limit value generating circuit 509 for generating a signal representing the upper limit value of the reference voltage of the A/D converter 511 of FIG. 2, and the reference voltage lower limit value generating circuit 510 for generating a signal representing the limit value of the reference voltage are simultaneously held by the sample-and-hold circuit 534 under the control of the sample-and-hold signal 807 outputted from the microcomputer 600. Moreover, as above described, when the held interference wave signals are converted by the A/D converter 511, the held reference voltages are used as the upper limit value and the lower limit value of the range of signal levels used in an A/D conversion, respectively. Consequently, A/D-converted data, which is unaffected by a change in the power supply, can be generated, so that more accurate detection of the position of the moving detection portion can be achieved.

Next, a method for obtaining the wavelength of laser light more accurately in the case of determining the wavelength thereof by means of the beam splitter 204 of the wavelength-dependent type will be described hereinbelow.

Namely, data representing accurately A/D-converted output voltages of the current-to-voltage converting circuits 505 and 506 are determined by using the following procedure.

In the device of FIG. 2, a reflected light signal and a transmitted light signal, which are respectively detected by the light receiving elements 403 and 404, are converted by the current-to-voltage converting circuits 505 and 506 into voltages, respectively. These voltages are amplified by amplifying circuits 532 and 533, respectively. The amplified voltages are A/D-converted by the A/D converter 511 through the sample-and-hold circuit 534 and a multiplexer 536.

In the amplifying circuits 532 and 533, the following equation (2) holds:

(the output voltage of the amplifying circuit)={(the output voltage of the current-to-voltage converting circuit)−(the reference voltage)}×(the amplification factor of the amplifying circuit)+ (the reference voltage lower limit value of the A/D converter) eq. (2)

The following equation (3) for obtaining (the reference voltage) is derived from this equation (2):

(the reference voltage)=[{(the reference voltage lower limit value of the A/D converter)−(the output voltage of the amplifying circuit)}/(the amplification factor of the amplifying circuit)]+ (the output voltage of the current-to-voltage converting circuit) eq. (3)

Based on this equation (3), the reference voltage of the aforesaid amplifying circuit is set according to an equation (5) which will be described below.

Namely, the microcomputer 600 holds output voltages of the current-to-voltage converting circuits 505 and 506 in response to the sample-and-hold signal 807 and then A/D-converts the output voltages thereof. Further, reference voltage data 808 to be set at the reference voltage generating circuits 530 and 531 are determined according to the equation (5) by using such A/D-converted data.

First, the relation between the output voltage of the current-to-voltage converting circuits 505 and 506 and the A/D-converted data of this output data is given by the following equation (4):

(the output voltage of the current-to-voltage converting circuit)= (the data obtained by A/D-converting the output voltage of the current-to-voltage converting circuit)×{(the reference voltage upper limit value of the A/D converter)−(the reference voltage lower limit value of the A/D converter)}/(the resolution used by the A/D converter)+(the reference voltage lower limit value of the A/D converter) eq. (4)

By substituting this equation (4) for (the output voltage of the current-to-voltage converting circuit) of the aforementioned equation (3), the following equation (5) for obtaining (the reference voltage data) is derived.

(the reference voltage data)=[{(the reference voltage lower limit value of the A/D converter)−(a desired output voltage of the amplifying circuit)}/(the amplification factor of the amplifying circuit)]+[(the data obtained by A/D converting the output voltage of the current-to-voltage converting circuit)×{(the reference voltage upper limit value)−(the reference voltage lower limit value)}/(the resolution used by the A/D converter)+(the reference voltage lower limit value of the A/D converter)] eq. (5)

Reference voltage data obtained by this equation (5) is set at the reference voltage generating circuit 530 and 531 by the microcomputer 600 as the reference voltage data 808. Further, results of D/A conversions performed on the reference voltage data by the reference voltage generating circuits 530 and 531 are respectively supplied to the amplifying circuits 532 and 533 as the reference voltages, and are also fed to the A/D converter 511 through the sample-and-hold circuit 534 and the multiplexer 536.

In this equation (5), (the reference voltage upper limit value of the A/D converter) and (the reference voltage lower limit value of the A/D converter) are fixed values determined correspondingly to the used A/D converters, respectively, and are generated by the reference voltage lower limit value generating circuit 510 and the reference voltage upper limit value generating circuit 509, respectively, as above described. Moreover, (the desired output voltage of the amplifying circuit) is, for instance, an arbitrary voltage value in the vicinity of an intermediate value between the lower limit value and the upper limit value of the reference voltage of the A/D converter 511. Furthermore, (the amplification factor of the amplifying circuit) is R1/R2 in the case of the device of FIG. 2. Additionally, R1 and R2 are preliminarily set in such a manner that (R1/R2)>>1. Besides, (the data obtained by A/D-converting the output voltage of the current-to-voltage converting circuit) is actually obtained as the result of the fact that the output voltage signals of the current-to-voltage converting circuits 505 and 506 may be inputted directly to the A/D converter 511 without flowing through the amplifying circuits 532 and 533. Incidentally, (the resolution used by the A/D converter) has a preliminarily known value.

As above-mentioned, the microcomputer 600 sets the reference voltage data 808, which is obtained by the aforementioned equation (5), at the reference voltage generating circuits 530 and 531. At that time, the sample-and-hold circuit 534 is put into a sampling state. Then, the microcomputer 600 puts the sample-and-hold circuit 534 into a holding state once again in response to the sample-and-hold signal 807. At that time, accurate output voltages of the current-to-voltage converting circuits 505 and 506 are obtained according to an equation (10), which will be described below, by using data respectively obtained by A/D-converting the output voltages of the held amplifying circuits 523 and 533 and the output voltages (namely, the reference voltages) of the reference voltage generating circuits 530 and 531.

First, note that there is established the following relation (6) among the output voltage (namely, the reference voltage lower limit value) of the reference voltage lower limit value generating circuit 510, the output voltages of the current-to-voltage converting circuits 505 and 506, the output voltages of the reference voltage generating circuits 530 and 531 and the output voltages of the amplifying circuits 532 and 533.

(the output voltage of the current-to-voltage converting circuit)=
[{(the output voltage of the amplifying circuit)−(the reference voltage lower limit value of the A/D converter)}/(the amplification factor of the amplifying circuit)]+(the output voltage of the reference voltage generating circuit)        eq. (6)

Further, the relation between the output voltage of each circuit and the A/D-converted data is given by the following equations (7), (8) and (9):

(the output voltage of the current-to-voltage converting circuit)=
(the data obtained by A/D-converting the output voltage of the current-to-voltage converting circuit)×(the reference voltage upper limit value of the A/D converter−the reference voltage lower limit value of the A/D converter)/(the resolution used by the A/D converter)+(the reference voltage lower limit value of the A/D converter)        eq. (7)

(the output voltage of the amplifying circuit)=(the data obtained by A/D-converting the output voltage of the amplifying circuit)×(the reference voltage upper limit value of the A/D converter−the reference voltage lower limit value of the A/D converter)/(the resolution used by the A/D converter)+(the reference voltage lower limit value of the A/D converter)        eq. (8)

(the output voltage of the reference voltage generating circuit)=
(the data obtained by A/D-converting the output voltage of the reference voltage generating circuit)×(the reference voltage upper limit value of the A/D converter−the reference voltage lower limit value of the A/D converter)/(the resolution used by the A/D converter)+(the reference voltage lower limit value of the A/D converter)        eq. (9)

Then, the following equation (10) for obtaining the accurately A/D-converted is derived by substituting the aforementioned equations (7), (8) and (9) for the aforementioned equation (6):

(the data obtained by A/D-converting the output voltage of the current-to-voltage converting circuit)=[{(the data obtained by A/D-converting the output voltage of the amplifying the output voltage of the reference voltage generating circuit)−(the reference voltage lower limit value of the A/D converter)}/(the amplification factor of the amplifying circuit)]+(the data obtained by A/D-converting the output voltage value of the reference voltage generating circuit)        eq. (10)

Figure 7:
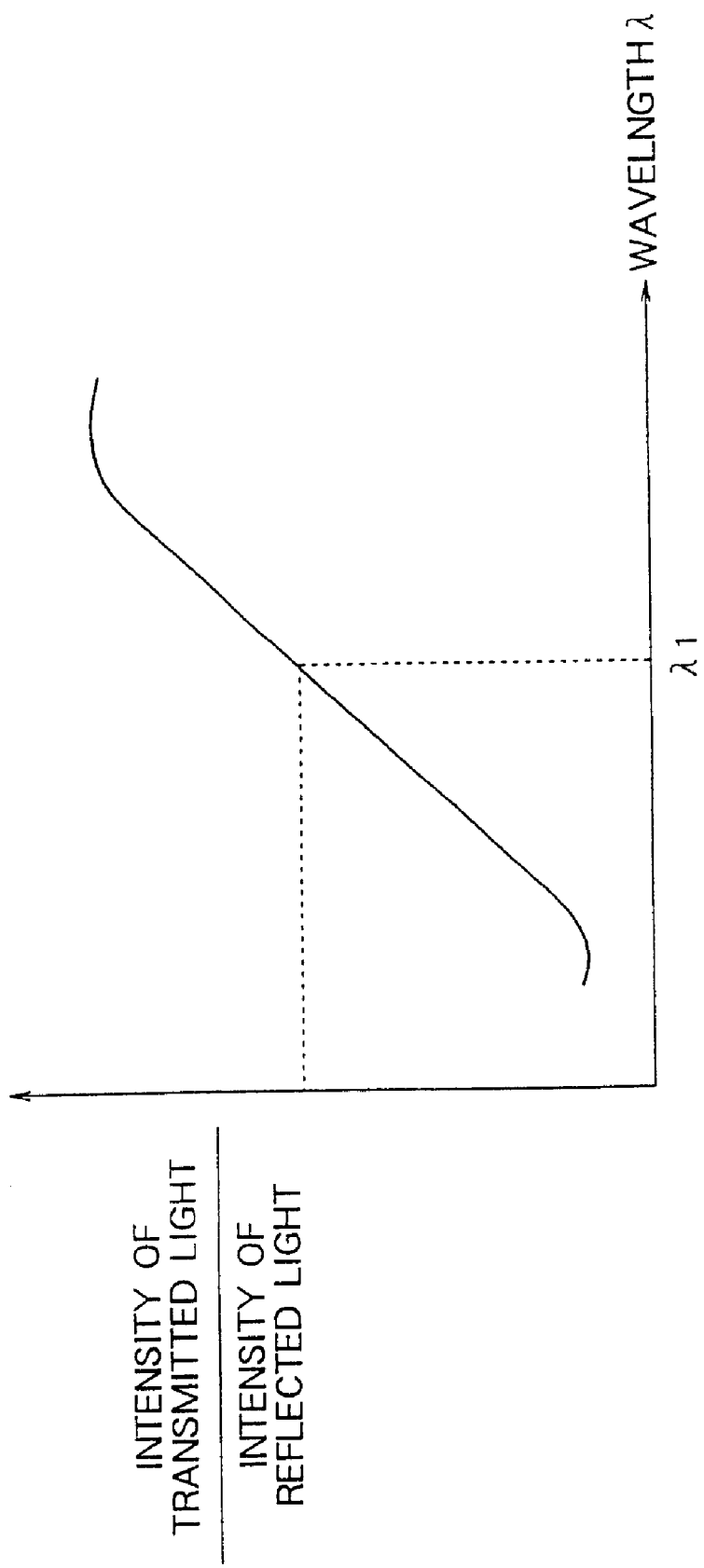
FIG. 7 is a diagram illustrating the relation between the ratio of the intensity of the transmitted light, which is obtained from laser light, to that of the reflected light obtained therefrom and the wavelength thereof in each of the length measuring device of the present invention and the conventional length measuring device.
Figure 8:
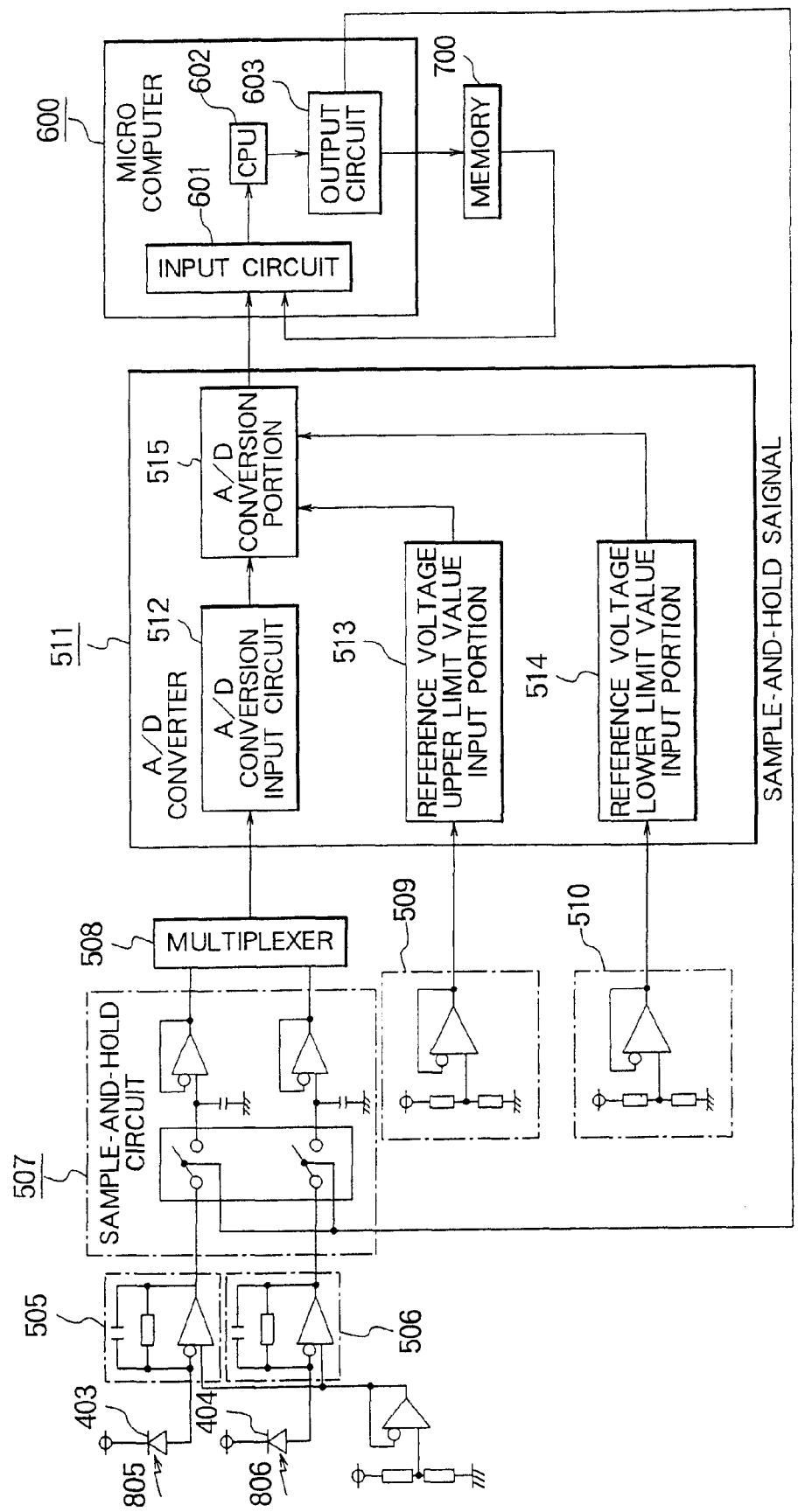
FIG. 8 is a diagram showing the configurations of another part of the signal processing portion, the operation portion and the storage portion of the conventional length device.

As the result of following the herein-above described procedure, the intensities of the transmitted light and the reflected light, which come from the beam splitter 204 of the wavelength-dependent type, are determined accurately without increasing the resolution used by the A/D converter 511. Moreover, the wavelength $\lambda$ of laser light is determined more accurately according to the table (incidentally, this table is stored in the memory 700) representing the relation between the wavelength of laser light and (the ratio of the intensity of the transmitted light thereof to the intensity of the reflected light thereof), which is illustrated in FIG. 7.

Furthermore, as shown in FIG. 2, each of switches 520, 521, 522 and 523 is inserted between a corresponding one of the light receiving elements 401, 402, 403 and 404, and a corresponding one of the current-to-voltage converting circuits 501, 502, 505 and 506. Then, the detection current outputted from each of the light receiving elements 401 to 404 is interrupted. The voltage levels thereof in such a condition are detected by the A/D converter 511. The state of each of the switches 520, 521, 522 and 523 is controlled according to a detection-current interrupting signal 809.

When a light signal is detected, the light signal is A/D-converted in a state in which each of the switches 520, 521, 522 and 523 are turned on. Subsequently, from detection data obtained by this A/D conversion, the data obtained in the aforementioned state, in which the detection current is interrupted, by the A/D conversion is subtracted. Thereby, a component corresponding only to conversion is detected. Consequently, there can be achieved a detection of the position of the moving detection portion, from which the variation in position thereof due to the drift caused by the electronic circuit is eliminated.

The variation in position, which is caused by the electronic circuit, is eliminated according to the following equation (11), in which the detection data is A/D-converted data.

(the data from which the variation caused by the electronic circuit is eliminated)=(the detection data obtained when the switches 520 to 523 are turned on)−(the detection data obtained when the switches 520 to 523 are in the break position)        eq. (11)

EMBODIMENT 2

Figure 3:
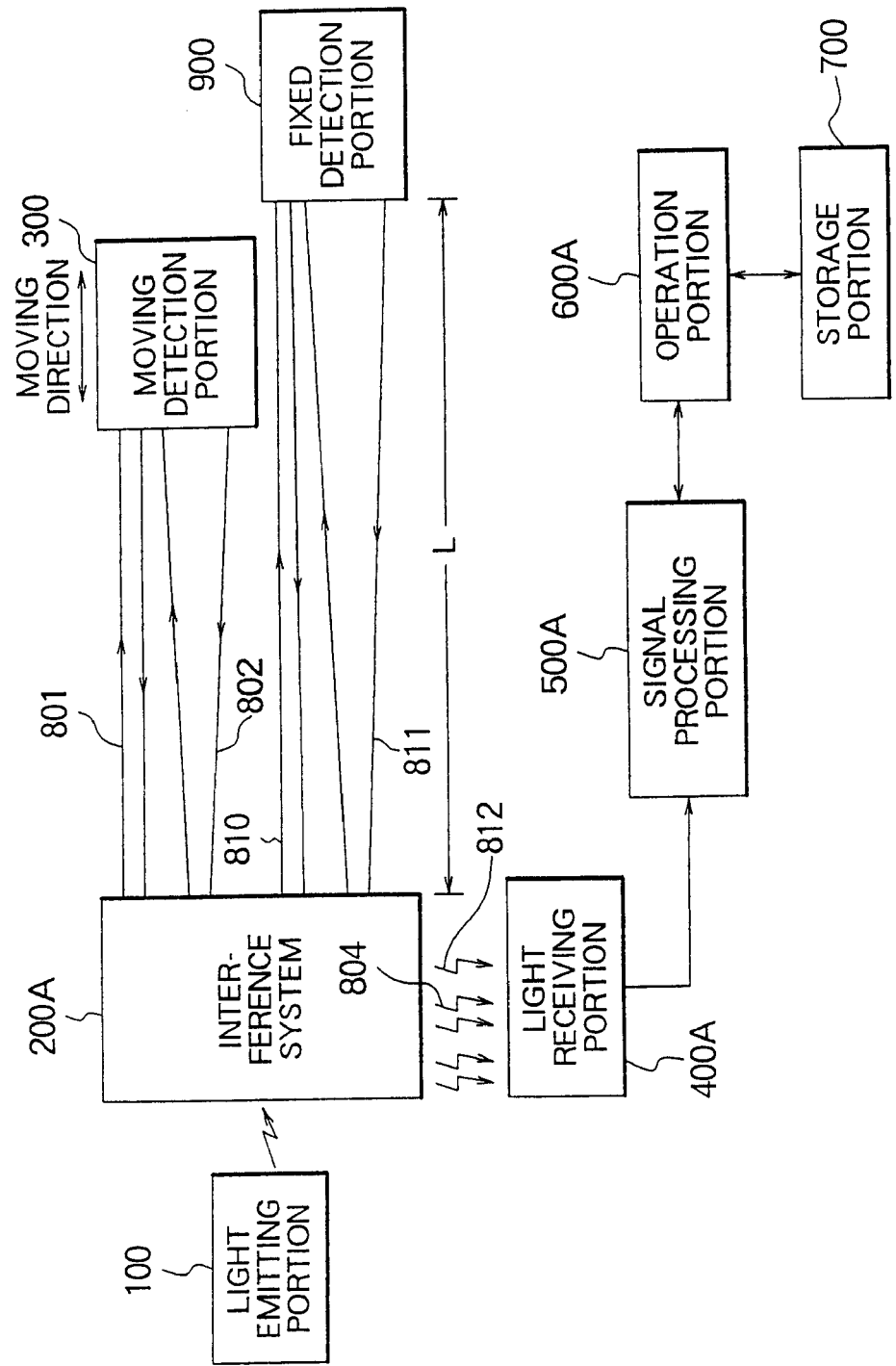
FIG. 3 is a block diagram schematically showing the configuration of another length measuring device which is "Embodiment 2" of this invention.
Figure 4:
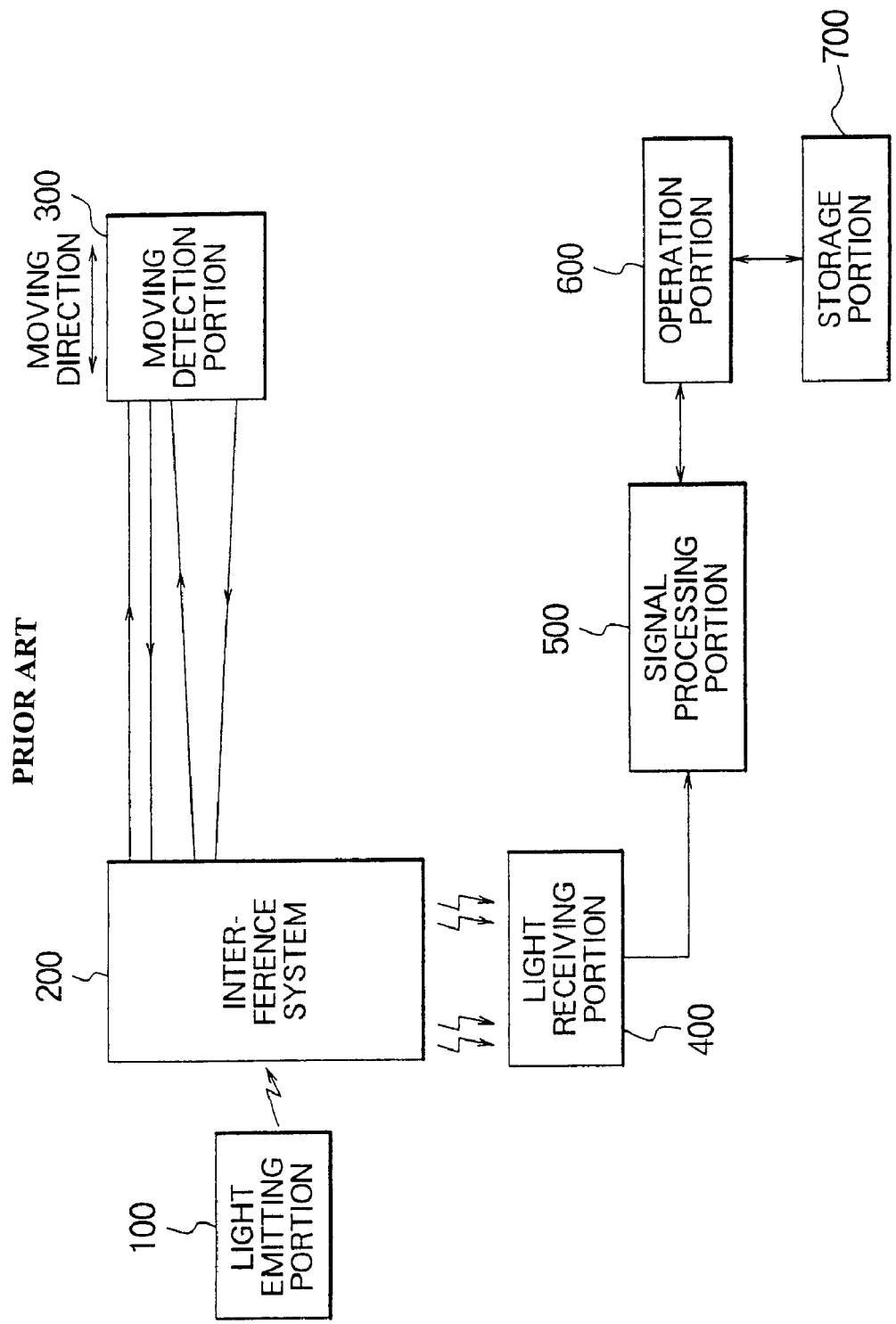
FIG. 4 is a block diagram schematically showing the configuration of the conventional length measuring device.

Length measuring device, which is "Embodiment 2" of this invention will be described hereinbelow by referring to FIG. 3. FIG. 3 is a block diagram schematically showing the configuration of a length measuring device which is "Embodiment 2" of this invention.

In FIG. 3, reference numeral 100 designates a light emitting portion for emitting laser light of a frequency f; 200A an interference system; 300 a moving detection portion; 400A a light receiving portion; 500A a signal processing portion; 600A an operation portion; 700 a storage portion; and 900 a fixed detection portion.

Figure 5:
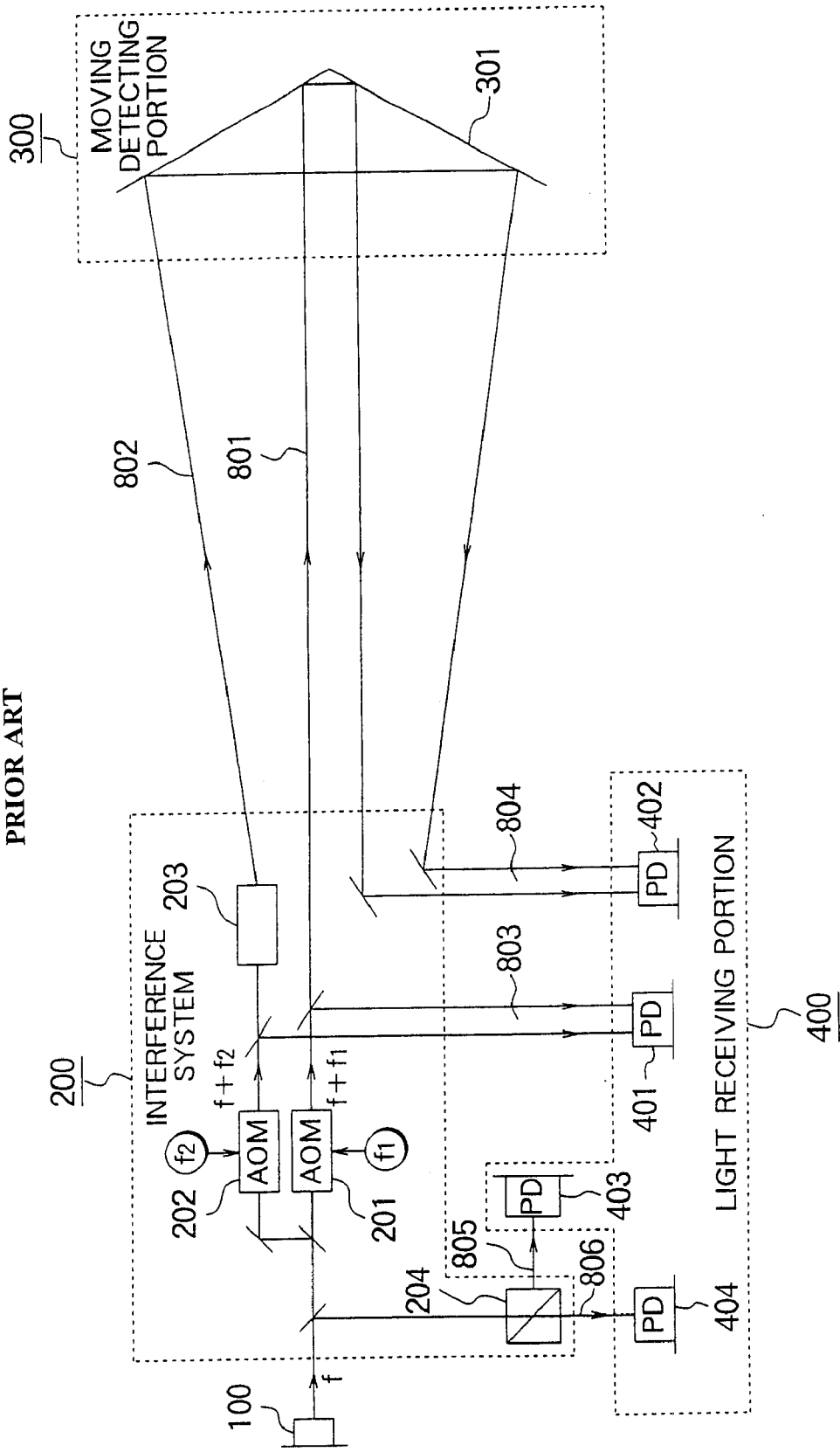
FIG. 5 is a diagram showing the configurations of the interference system, the moving detection portion and the light receiving portion of each of the length measuring device of the present invention and the conventional length measuring device.
Figure 6:
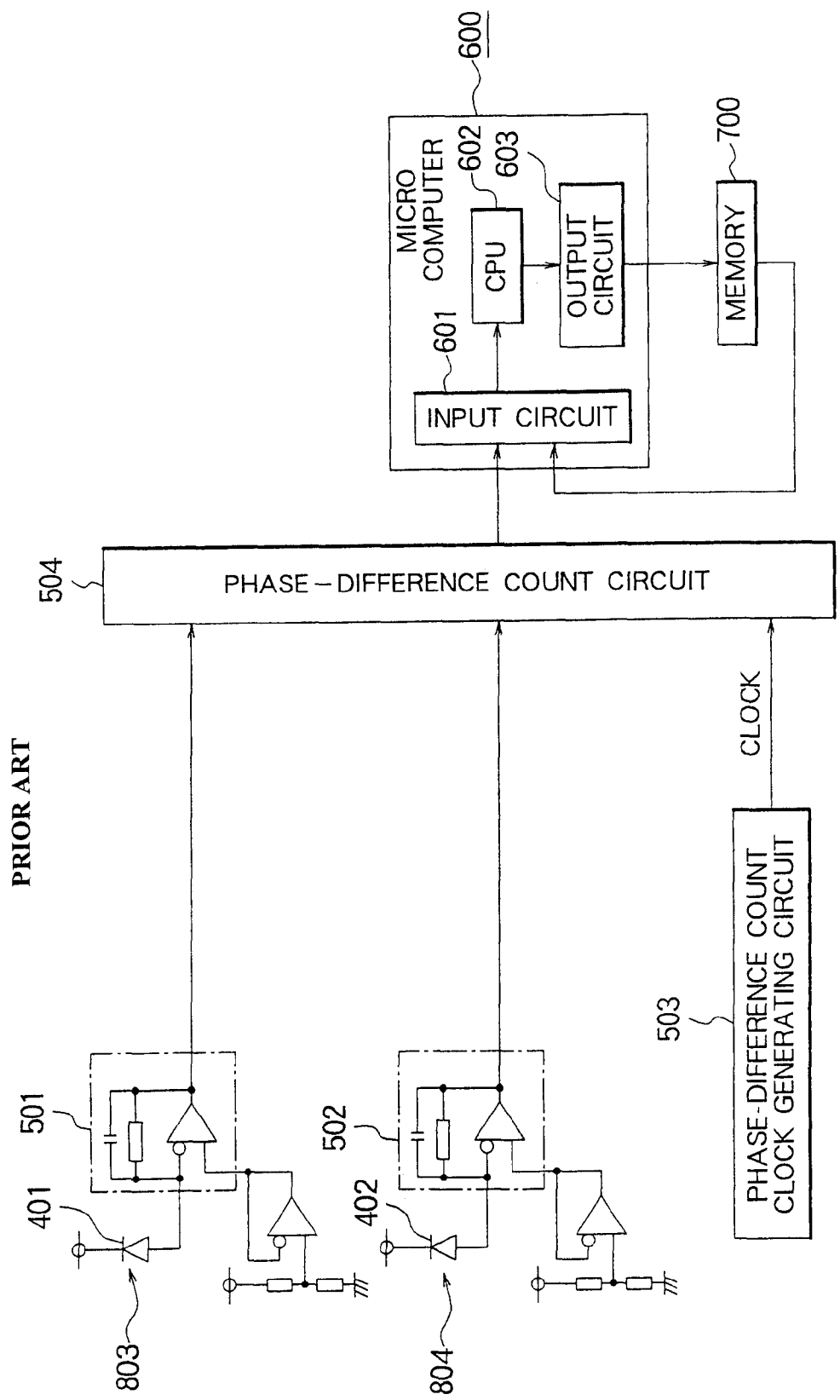
FIG. 6 is a diagram showing the configurations of a part of the signal processing portion, the operation portion and the storage portion of the conventional length measuring device.

In addition to the optical system corresponding to the moving detection portion 300 in the interference system 200 of FIG. 5, the interference system of FIG. 3 is provided with a similar optical system corresponding to the fixed detection portion 900. Incidentally, the interference system 200A is provided only with an optical system to be used for generating the detection interference wave by means of the fixed detection portion 900. Regarding an optical system for generating the reference interference wave, the interference system 200A uses an optical system of the moving detection portion 300, if necessary. Additionally, the internal structure of the fixed detection portion 900 is similar to that of the moving detection portion 300 of FIG. 5.

In the case of this "Embodiment 2", light emitted from the light emitting portion 100 is incident on the moving detection potion 300 and the fixed detection portion 900 from the interference system 200A. Then, the incident light is reflected from each of the moving detection potion 300 and the fixed detection portion 900. Subsequently, the reflected light is incident on the interference system 200A again.

Reference light 801 is outputted from the interference system 200A perpendicularly (or straight) to the moving detection portion 300. In contrast, the detection light 802 is outputted from the interference system 200 at a certain inclination angle. As a result, there is caused an optical-path-length difference between the reference light 801 and the detection light 802. Therefore, the detection interference wave 804 is obtained in the interference system 200A. This detection interference wave 804 is converted by the light receiving element 402 of the light receiving portion 400A into an electrical signal which is then supplied to the signal processing portion 500A.

Similarly, the reference light 810 is outputted from the interference system 200A perpendicularly (namely, straight) to the fixed detection portion 900. In contrast, detection light 811 is outputted from the interference system 200A at a certain inclination angle. As a consequence, there is caused an optical-path-length difference between the reference light 810 and the detection light 811. Therefore, detection interference wave 812 is obtained in the interference system 200A. This detection interference wave 812 is converted by a light receiving element (not shown) of the light receiving portion 400A into an electrical signal which is subsequently supplied to the signal processing portion 500A.

The correction of a phase difference corresponding to the moving detection portion 300 is performed according to the following equation (12):

(the post-correction phase difference corresponding to the moving detection portion)=(the pre-correction phase difference corresponding to the moving detection portion)×(the phase-difference correction constant)     eq. (12)

Incidentally, the aforesaid "(phase-difference correction constant)" is given by the following equation (13):

(the phase-difference correction constant)=(the phase difference corresponding to the fixed detection portion)/(the reference phase difference)     eq. (13)

The aforesaid "(pre-correction phase difference corresponding to the moving detection portion)" in the equation (12) is the total phase difference corresponding to the moving detection portion 300, which is determined according to the wavelength $\lambda$ of laser light and the phase difference, similarly as determined in the aforementioned "Embodiment 1".

Further, the "(phase difference corresponding to the fixed detection portion)" in the equation (13) is obtained by first finding "n" from the wavelength $\lambda$, which is determined by using the beam splitter 204 of the wavelength-dependent type, and the optical-path-length difference corresponding to the fixed detection portion 900 and then obtaining "$2\pi n$" and finally adding a phase difference, which is observed in the fixed detection portion 900, to this "$2\pi n$".

Moreover, the "(reference phase difference)" in the equation (13) is the total phase difference corresponding to the fixed detection portion 900, which is obtained in the case that the position of the fixed detection portion 900 is "L" when the wavelength of laser is the known laser wavelength $\lambda_0$. This total phase difference is obtained at the time of assembling and adjusting and is stored in the storage portion 700.

Characteristic aspect of this length measuring device, which is "Embodiment 2", resides in that the detection accuracy thereof is less sensitive to an error due to variation in characteristics of the beam splitter 204 of the wavelength-dependent type. Namely, the influence of an error in detection of the wavelength $\lambda$ of laser light owing to the beam splitter 204 of the wavelength-dependent type can be alleviated.

INDUSTRIAL APPLICABILITY

As above described, a length measuring device of this invention comprises: a light emitting portion for emitting laser light; an interference system for receiving the aforesaid laser light, for generating reference light having a first frequency, for outputting the reference light straight, for generating detection light having a second frequency, and for outputting the aforesaid detection light at a predetermined tilt angle; a moving detection portion for reflecting the aforesaid reference light and the aforesaid detection light toward the aforesaid interference system; a light receiving portion for converting a reference interference wave, which is generated by the aforesaid interference system, into a first sinusoidal wave electrical signal according to the aforesaid laser light and for converting a detection interference wave, which is generated from an optical-path-length difference between the aforesaid reflected reference light and the aforesaid reflected detection light, into a second sinusoidal wave electrical signal; a signal processing portion for generating a first cosinusoidal wave signal from the aforesaid first sinusoidal wave signal, for generating a second cosinusoidal wave signal from the aforesaid second sinusoidal wave signal, and for A/D-converting the aforesaid first sinusoidal wave signal and the aforesaid first cosinusoidal wave signal, and the aforesaid second sinusoidal wave signal and the aforesaid second cosinusoidal wave signal; and an operation portion for obtaining an electrical angle of the aforesaid reference interference wave according to a ratio between the A/D-converted first sinusoidal wave data and the A/D-converted first cosinusoidal wave data, for obtaining an electrical angle of the aforesaid detection interference wave according to a ratio between the A/D-converted-second sinusoidal wave data and the A/D-converted second cosinusoidal wave data, for obtaining a phase difference between the aforesaid reference interference wave and the aforesaid detection interference wave from the aforesaid two electrical angles, and for detecting a position of the aforesaid moving detection portion according to this phase difference and a wavelength of the aforesaid laser light. Thus, this length measuring device has an advantageous effect in that high-resolution position data can be detected.

Further, as above described, a length measuring device of this invention is adapted so that the aforesaid signal processing portion includes a cosinusoidal wave generating circuit for generating a cosinusoidal wave signal, and that the aforesaid operation portion is operative to correct a phase error of the aforesaid cosinusoidal wave signal generating circuit according to an addition theorem applied to trigonometric functions. Thus, this length measuring device has an advantageous effect in that accurate position data, whose phase error caused by the electronic circuit is corrected, can be detected.

Moreover, as above described, a length measuring device of this invention is adapted so that the aforesaid cosinusoidal wave generating circuit is a differentiating circuit, and that the aforesaid operation portion is operative to correct a phase lag of the aforesaid differentiating circuit according to an addition theorem applied to trigonometric functions. Thus, this length measuring device has an advantageous effect in that accurate position data, whose phase error caused by the electronic circuit is corrected, can be detected.

Additionally, as above described, a length measuring device of this invention is adapted so that the aforesaid cosinusoidal wave generating circuit is an integrating circuit, and that the aforesaid operation portion is operative to correct a phase advance of the aforesaid integrating circuit according to an addition theorem applied to trigonometric functions. Thus, this length measuring device has an advantageous effect in that accurate position data, whose phase error caused by the electronic circuit is corrected, can be detected.

Besides, as above described, a length measuring device of this invention is adapted so that the aforesaid signal processing portion includes an inverting circuit, a sample-and-hold circuit and an A/D converter, and that the aforesaid inverting circuit is operative to perform an inversion on the aforesaid first sinusoidal wave signal and the aforesaid first cosinusoidal wave signal and the aforesaid second sinusoidal wave signal and the aforesaid second cosinusoidal wave signal, that the aforesaid sample-and-hold circuit holds the aforesaid inverting signals, which are obtained by the inversion, and original non-inverting signals simultaneously, and that the aforesaid A/D converter is operative to A/D-convert the aforesaid signals held simultaneously. Thus, this length measuring device has an advantageous effect in that position data, which has a two-fold resolution, can be detected without enhancing the resolution used by the A/D converter.

Further, as above described, a length measuring device of the present invention is adapted so that the aforesaid signal processing portion includes a reference voltage generating circuit for generating a reference voltage of the aforesaid A/D converter, and that the aforesaid sample-and-hold circuit is operative to simultaneously hold the reference voltage of the aforesaid A/D converter when simultaneously holding the aforesaid inverting signal and the aforesaid original non-inverting signal. Thus, this length measuring device has an advantageous effect in that the influence of a variation in the power supply can be eliminated.

Moreover, as above described, a length measuring device of the present invention is adapted so that the aforesaid system includes a beam splitter of the wavelength-dependent type for receiving the aforesaid laser light and for outputting reflected light and transmitted light, which are respectively obtained by reflecting and transmitting the aforesaid laser light, that the aforesaid light receiving portion converts the aforesaid reflected light and the aforesaid transmitted light into electrical signals, and that the aforesaid signal processing portion includes an amplifying circuit for amplifying the aforesaid electrical signals, and a reference voltage generating circuit for generating a reference voltage of the aforesaid amplifying circuit, and that the aforesaid operation portion is operative to change the reference voltage of the aforesaid amplifying circuit by controlling the aforesaid reference voltage generating circuit according to variations in amounts of the aforesaid reflected light and the aforesaid transmitted light, which are caused owing to a change in wavelength of the aforesaid laser light. Thus, this length measuring device has advantageous effects in that the resolution of the reflected light and the transmitted light coming from the aforesaid beam splitter of the wavelength-dependent type can be increased without enhancing the resolution used by the A/D converter, and that the accurate position of the moving detection portion can be detected by following a minute change in wavelength of laser light.

Furthermore, as above described, a length measuring device of this invention is adapted so that the aforesaid signal processing portion includes a switch for turning on or off an electrical signal coming from the aforesaid light receiving portion, and that the aforesaid operation portion is operative to eliminate a variation, which corresponds to a drift, by subtracting data, which is obtained when the aforesaid switch is turned off, from data obtained when the aforesaid switch is turned on. Thus, this length measuring device has an advantageous effect in that accurate position data, whose phase error caused by the electronic circuit is corrected, can be detected.

Additionally, as above described, a length measuring device of this invention further comprises a fixed detection portion, which has a structure similar to that of the aforesaid moving detection portion and is fixed at a known distance from the aforesaid interference system, and is adapted so that the aforesaid operation portion is operative to calculate a phase difference relating to the aforesaid fixed detection portion similarly as in a case of the aforesaid moving detection portion, and to correct the detected phase difference relating to the aforesaid moving detection portion. Thus, this length measuring device has advantageous effects in that an occurrence of a detection error owing to variation in characteristics of the beam splitter of the wavelength-dependent type can be prevented and that the accurate position of the moving detection portion can be achieved.

What is claimed is:

1. A length measuring device comprising:

a light emitting portion for emitting laser light;

an interference system for receiving said laser light, for generating reference light having a first frequency, for outputting the reference light straight, for generating detection light having a second frequency, and for outputting said detection light at a predetermined tilt angle;

a moving detection portion for reflecting said reference light and said detection light toward said interference system;

a light receiving portion for converting a reference interference wave, which is generated by said interference system, into a first sinusoidal wave electrical signal according to said laser light and for converting a detection interference wave, which is generated from an optical-path-length difference between said reflected reference light and said reflected detection light, into a second sinusoidal wave electrical signal;

a signal processing portion for generating a first cosinusoidal wave signal from said first sinusoidal wave signal, for generating a second cosinusoidal wave signal from said second sinusoidal wave signal, and for A/D-converting said first sinusoidal wave signal and said first cosinusoidal wave signal, and said second sinusoidal wave signal and said second cosinusoidal wave signal; and an operation portion for obtaining an electrical angle of said reference interference wave according to a ratio between the A/D-converted first sinusoidal wave data and the A/D-converted first cosinusoidal wave data, for obtaining an electrical angle of said detection interference wave according to a ratio between the A/D-converted second sinusoidal wave data and the A/D-converted second cosinusoidal wave data, for obtaining a phase difference between said reference interference wave and said detection interference wave from said two electrical angles, and for detecting a position of said moving detection portion according to this phase difference and a wavelength of said laser light.

2. The length measuring device as set forth in claim 1, wherein said signal processing portion includes a cosinusoidal wave generating circuit for generating a cosinusoidal wave signal, and wherein said operation portion is operative to correct a phase error of said cosinusoidal wave signal generating circuit according to an addition theorem applied to trigonometric functions.

3. The length measuring device as set forth in claim 2, wherein said cosinusoidal wave generating circuit is a differentiating circuit, and wherein said operation portion is operative to correct a phase lag of said differentiating circuit according to an addition theorem applied to trigonometric functions.

4. The length measuring device as set forth in claim 2, wherein said cosinusoidal wave generating circuit is an integrating circuit, and wherein said operation portion is operative to correct a phase advance of said integrating circuit according to an addition theorem applied to trigonometric functions.

5. The length measuring device as set forth in claim 1, wherein said signal processing portion includes an inverting circuit, a sample-and-hold circuit and an A/D converter, wherein said inverting circuit is operative to perform an inversion on said first sinusoidal wave signal and said first cosinusoidal wave signal and said second sinusoidal wave signal and said second cosinusoidal wave signal, wherein said sample-and-hold circuit holds said inverting signals, which are obtained by the inversion, and original non-inverting signals simultaneously, and wherein said A/D converter is operative to A/D-convert said signals held simultaneously.

6. The length measuring device as set forth in claim 5, wherein said signal processing portion includes a reference voltage generating circuit for generating a reference voltage of said A/D converter, and wherein said sample-and-hold circuit is operative to simultaneously hold the reference voltage of said A/D converter when simultaneously holding said inverting signal and said original non-inverting signal.

7. The length measuring device as set forth in claim 1, wherein said system includes a beam splitter of a wavelength-dependent type for receiving said laser light and for outputting reflected light and transmitted light, which are respectively obtained by reflecting and transmitting said laser light, wherein said light receiving portion converts said reflected light and said transmitted light into electrical signals, and wherein said signal processing portion includes an amplifying circuit for amplifying said electrical signals, and a reference voltage generating circuit for generating a reference voltage of said amplifying circuit, and wherein said operation portion is operative to change the reference voltage of said amplifying circuit by controlling said reference voltage generating circuit according to variations in amounts of said reflected light and said transmitted light, which are caused owing to a change in wavelength of said laser light.

8. The length measuring device as set forth in claim 1, wherein said signal processing portion includes a switch for turning on or off an electrical signal coming from said light receiving portion, and wherein said operation portion is operative to eliminate a variation, which corresponds to a drift, by subtracting data, which is obtained when said switch is turned off, from data obtained when said switch is turned on.

9. The length measuring device as set forth in claim 1, which further comprises a fixed detection portion, which has a structure similar to that of said moving detection portion and is fixed at a known distance from the said interference system, wherein said operation portion is operative to calculate a phase difference relating to said fixed detection portion similarly as in a case of said moving detection portion, and to correct the detected phase difference relating to said moving detection portion.

* * * * *